US010604302B2

(12) United States Patent
Griscik et al.

(10) Patent No.: US 10,604,302 B2
(45) Date of Patent: Mar. 31, 2020

(54) POLYMER COATED PAPERBOARD CONTAINER AND METHOD

(71) Applicant: Altria Client Services LLC, Richmond, VA (US)

(72) Inventors: Gregory James Griscik, Midlothian, VA (US); Chris Simpson, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 593 days.

(21) Appl. No.: 13/682,412

(22) Filed: Nov. 20, 2012

(65) Prior Publication Data
US 2014/0137518 A1 May 22, 2014

(51) Int. Cl.
*B65D 25/14* (2006.01)
*B05D 1/02* (2006.01)
(Continued)

(52) U.S. Cl.
CPC .............. *B65D 25/14* (2013.01); *A24F 23/00* (2013.01); *B05B 7/0416* (2013.01);
(Continued)

(58) Field of Classification Search
CPC ........ B65D 25/14; B65D 3/04; B05B 12/085; B05B 7/0416; B05B 7/0441; D21H 23/44;
(Continued)

(56) References Cited

U.S. PATENT DOCUMENTS

| 2,892,735 A | * | 6/1959 | Curler | D21G 9/009 |
| | | | | 427/369 |
| 2,984,585 A | * | 5/1961 | Sherman | D21H 19/18 |
| | | | | 229/5.85 |

(Continued)

FOREIGN PATENT DOCUMENTS

| EP | 0476232 A2 | 3/1992 |
| GB | 2450872 | 1/2009 |
| WO | WO 2010130533 A1 * | 11/2010 ............... A46D 1/00 |

OTHER PUBLICATIONS

International Search Report of International Application No. PCT/US2013/071017 dated Jan. 29, 2014.
(Continued)

*Primary Examiner* — Chelsea E Stinson
*Assistant Examiner* — Thomas M Wittenschlaeger
(74) *Attorney, Agent, or Firm* — Harness, Dickey & Pierce, P.L.C.

(57) ABSTRACT

A method of forming a coating on a cylindrical paperboard container having a closed end. The method includes the steps of heating a gas from a first temperature to a second temperature; providing the gas to a first inlet of a nozzle; providing a polymer in a liquid state at a third temperature; providing the polymer to a second inlet of the nozzle; and spraying the polymer onto the cylindrical paperboard container using the nozzle; wherein the second temperature is greater than the third temperature; and the second temperature and third temperature are such that the gas maintains the polymer in the liquid state at least until the polymer comes into contact with the cylindrical paperboard container. A system for applying a coating to a plurality of cylindrical paperboard containers and a container for a consumer product are also provided.

7 Claims, 3 Drawing Sheets

(51) Int. Cl.
*B65B 1/00* (2006.01)
*D21H 27/10* (2006.01)
*D21H 23/66* (2006.01)
*D21H 23/50* (2006.01)
*D21H 19/22* (2006.01)
*A24F 23/00* (2006.01)
*D21H 23/44* (2006.01)
*B05B 7/04* (2006.01)
*B05B 12/08* (2006.01)
*B65D 3/04* (2006.01)

(52) U.S. Cl.
CPC .............. *B05B 12/085* (2013.01); *B05D 1/02* (2013.01); *B65B 1/00* (2013.01); *B65D 3/04* (2013.01); *D21H 19/22* (2013.01); *D21H 23/44* (2013.01); *D21H 23/50* (2013.01); *D21H 23/66* (2013.01); *D21H 27/10* (2013.01)

(58) Field of Classification Search
CPC ........ D21H 23/50; D21H 19/22; D21H 23/66; D21H 27/10; A24F 23/00; B65B 1/00; B05D 1/02; B05C 9/14; B05C 5/0225; B05C 5/0237; B05C 5/0291; Y10S 118/03; B31F 1/2886; B31F 1/2872
USPC .................................................. 118/684, 302
See application file for complete search history.

(56) References Cited

U.S. PATENT DOCUMENTS

| | | | |
|---|---|---|---|
| 3,112,211 A | | 11/1963 | Ward et al. |
| 3,260,690 A | | 7/1966 | Bohnert et al. |
| 3,449,145 A | | 6/1969 | Bloom et al. |
| 3,617,351 A | * | 11/1971 | Long .................. B05D 7/16 427/194 |
| 3,659,772 A | | 5/1972 | Dorsey et al. |
| 4,005,824 A | * | 2/1977 | Becker .................. B05B 7/02 239/289 |
| 4,049,842 A | | 9/1977 | Gerek et al. |
| 4,147,836 A | | 4/1979 | Middleton et al. |
| 4,608,398 A | * | 8/1986 | Cobbs et al. ................. 521/113 |
| 4,679,724 A | | 7/1987 | Inagaki |
| 5,078,313 A | | 1/1992 | Matheson et al. |
| 5,108,382 A | * | 4/1992 | Wright .................. A61F 5/445 604/332 |
| 5,240,183 A | * | 8/1993 | Bedaw .................. B05B 7/0466 239/403 |
| 5,248,719 A | * | 9/1993 | Kehr .................. C08L 51/06 524/423 |
| 5,429,840 A | * | 7/1995 | Raterman .................. B05B 7/0884 118/324 |
| 5,635,279 A | | 6/1997 | Ma et al. |
| 6,482,281 B1 | * | 11/2002 | Schmidt ................. C09J 123/10 156/108 |
| 6,488,773 B1 | * | 12/2002 | Ehrhardt .................. B05B 7/0807 118/302 |
| 7,524,771 B2 | * | 4/2009 | Izumi ...................... B08B 3/02 134/1 |
| 7,798,319 B1 | | 9/2010 | Bried et al. |
| 7,857,128 B2 | | 12/2010 | Deevi |
| 2003/0170988 A1 | * | 9/2003 | Izumi ..................... B05B 7/066 438/689 |
| 2005/0100749 A1 | * | 5/2005 | Hu et al. ..................... 428/461 |
| 2006/0175432 A1 | * | 8/2006 | Brock et al. .................. 239/298 |
| 2006/0257581 A1 | * | 11/2006 | Wulteputte ........... B05B 7/0815 427/427.2 |
| 2007/0110928 A1 | * | 5/2007 | Bried ...................... B65D 1/22 428/34.1 |
| 2008/0083369 A1 | | 4/2008 | Nakamura et al. |
| 2008/0202956 A1 | | 8/2008 | Welk et al. |
| 2008/0292810 A1 | * | 11/2008 | Anderson et al. ............ 427/565 |
| 2009/0035414 A1 | | 2/2009 | Cheng et al. |
| 2009/0104343 A1 | * | 4/2009 | Espenschied ......... B05B 12/085 427/9 |
| 2010/0000888 A1 | * | 1/2010 | Cronin ................... B65D 25/02 206/265 |
| 2010/0009093 A1 | | 1/2010 | Scott et al. |
| 2010/0206183 A1 | * | 8/2010 | Murphy .................. A23L 3/003 99/487 |
| 2010/0206320 A1 | | 8/2010 | Hodgson et al. |
| 2011/0014385 A1 | * | 1/2011 | Ahonen et al. ............ 427/421.1 |
| 2011/0083685 A1 | | 4/2011 | Adams et al. |
| 2011/0284405 A1 | | 11/2011 | Mitten et al. |
| 2012/0000165 A1 | | 6/2012 | Willaims |

OTHER PUBLICATIONS

"Dip Tobacco Cans", retrieved from the Internet Feb. 22, 2012 <http://www.diptobacco.net/dip-cans.html>.
International Preliminary Report on Patentability of PCT Application No. PCT/US2013/071017 dated Jun. 4, 2015.
Office Action for corresponding Canadian Application No. 2,892,016 dated Jul. 9, 2018.
Swedish Search Report for corresponding Application No. 1850236-9 dated Sep. 5, 2018, English translation thereof.
Office Action for corresponding Canadian Application No. 2,892,016 dated Aug. 30, 2017.
Office Action for corresponding Canadian Application No. 2,892,016 dated Nov. 4, 2016.
Swedish Notice of Allowance for corresponding Application No. 1850236-9 dated May 13, 2019.

* cited by examiner

POLYMER COATED PAPERBOARD CONTAINER AND METHOD

FIELD

This disclosure relates generally to containers and, more specifically, to methods and systems for manufacturing a coated container for moist smokeless tobacco.

SUMMARY

Moist smokeless tobacco (MST) is typically provided to the consumer in a lidded cylindrical container composed of either paperboard or plastic. Paperboard containers are preferred by some consumers since this is a traditional packaging for MST. Paperboard containers also provide the benefit of being biodegradable. The surfaces of these paperboard containers may be coated with paraffin wax prior to filling with MST to provide a moisture barrier that helps maintain the flavor and freshness of the MST in the container. The wax coating also gives the paperboard container a distinctive look. The wax coating additionally provides a certain amount of friction between the paperboard container and the lid that holds the lid in place on the container.

The degree of uniformity of the wax coating on the container can affect the consumer's overall impression of the product. A coating that is too thin may not provide sufficient friction to hold the lid in place on the container, thereby resulting in spills and/or moisture loss. A coating that is too thick may make it very difficult to take the lid off the container. Also, the wax may crack after being applied to the can, which can lead to moisture loss and/or wax particles in the MST product.

According to aspects disclosed herein, there is a method and system for manufacturing a container for MST. Various aspects also include a container made using the method and/or system. In embodiments, the container comprises a paperboard container coated with a polymer. The polymer coating may be used as an alternative to, or in addition to, a wax coating. The polymer may comprise an olefin, and preferably comprises polypropylene, which provides a moisture barrier, lid friction, and visual appearance to the paperboard container similar to that of wax. In embodiments, the polymer is efficiently and evenly applied to the unique geometry of surfaces of an MST container using a spraying method and system. In this manner, implementations provide a method and system for manufacturing a polymer-coated paperboard container for MST.

According to a first aspect, there is a method of forming a coating on a cylindrical paperboard container having a closed end. The method includes the steps of heating a gas from a first temperature to a second temperature; providing the gas to a first inlet of a nozzle; providing a polymer in a liquid state at a third temperature; providing the polymer to a second inlet of the nozzle; and spraying the polymer onto the cylindrical paperboard container using the nozzle; wherein the second temperature is greater than the third temperature; and the second temperature and third temperature are such that the gas maintains the polymer in the liquid state at least until the polymer comes into contact with the cylindrical paperboard container.

According to another aspect, there is a system for applying a coating to a plurality of cylindrical paperboard containers. The system includes a nozzle having a spray zone; a gas source that provides heated compressed air to a first inlet of the nozzle; a polymer source that provides a polymer in a liquid state to a second inlet of the nozzle; a conveying system structured and arranged to sequentially convey the plurality of cylindrical paperboard containers through the spray zone; and a controller configured to selectively control a valve that opens and closes the nozzle; wherein the controller opens the nozzle to spray the polymer onto one of the plurality of cylindrical paperboard containers when the conveying system positions the one of the plurality of cylindrical paperboard containers in the spray zone; and the controller closes the nozzle when a gap between adjacent ones of the plurality of cylindrical paperboard containers is in the spray zone.

According to another aspect, there is a container for a consumer product such as moist smokeless tobacco product. The container includes a paperboard cylindrical sidewall; a paperboard bottom disc connected to the a lower section of the sidewall, wherein interior surfaces of the sidewall and bottom disc define a cavity for holding the moist smokeless tobacco product; a lid recess at an upper section of the sidewall; a metal lid structured and arranged to frictionally engage the lid recess for closing the container; and a polymer layer on the interior surfaces of the sidewall and bottom disc.

BRIEF DESCRIPTION OF THE DRAWINGS

Various aspects are further described in the detailed description which follows, in reference to the noted plurality of drawings by way of non-limiting examples of embodiments, in which like reference numerals represent similar parts throughout the several views of the drawings.

DETAILED DESCRIPTION

Figure 1:
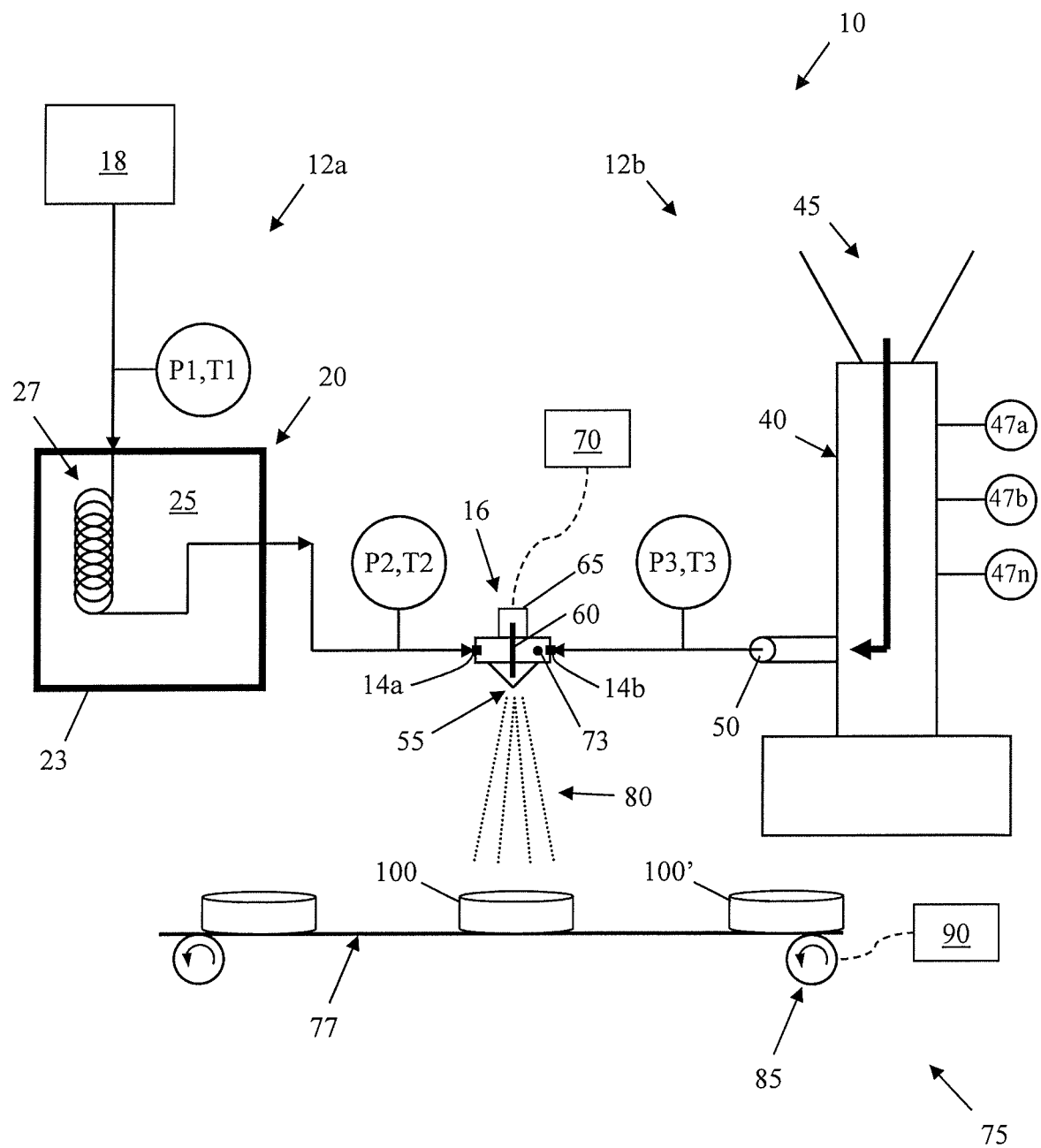
FIG. 1 shows a system for applying a polymer coating to a container in accordance herewith.

This disclosure relates generally to containers and, more specifically, to methods and systems for manufacturing a coated container for moist smokeless tobacco. FIG. 1 shows a system 10 for applying a polymer coating to a container in accordance with aspects disclosed herein. The system 10 comprises a compressed air section 12a that supplies heated compressed air to a first inlet 14a of a nozzle 16. The system 10 also includes a process fluid section 12b that provides molten polymer (also referred to herein as polymer fluid) to a second inlet 14b of the nozzle 16. In accordance herewith, the nozzle 16 sprays the molten polymer onto surfaces of a container 100 to provide a polymer coating on the container 100. The container 100 may comprise a paperboard container having a cylindrical shape and a closed bottom end, and may be used for holding an amount of MST product.

In embodiments, the compressed air section 12a includes a pressurized air supply 18 such as, for example, a compressor, pressurized air bottle, etc. The air supply 18 is connected by appropriate plumbing to a heater 20 and provides compressed air at a first pressure P1 and first temperature T1 to the heater 20 via the plumbing. In embodiments, the first pressure P1 is achieved using a pressure regulator at the air supply 18 and is in the range of about 15 psig to about 25 psig, and preferably about 20 psig, although other first pressures may be used within the scope of the disclosure. The first temperature T1 is normal room temperature, which may be in the range of about 65° F. to about 75° F., and preferably about 70° F., although other first temperatures may be used.

The heater 20 of the compressed air section 12a heats the compressed air to a second temperature T2 and provides the heated compressed air to the first inlet 14a of the nozzle 16. The heater 20 may comprise any suitable device that is configured to heat the compressed air from the first temperature T1 to the second temperature T2. For example, the heater 20 may comprise an oven 23 with an enclosed heating space 25 that is maintained at the second temperature T2 or higher. A conduit 27 carrying the compressed air may be routed through the heating space 25. The conduit 27 may comprise a coil or other circuitous path that provides sufficient residence time of the compressed air inside the heating space 25 to raise the temperature of the compressed air from the first temperature T1 to the second temperature T2.

In a non-limiting exemplary embodiment, the conduit 27 comprises a coil of about 25 linear feet and the heating space 25 inside the oven 23 is maintained at or slightly above the second temperature T2. In this manner, the compressed air is heated in the heater 20 to the second temperature T2 and provided to the first inlet 14a at the second temperature T2 and a second pressure P2. In embodiments, the second temperature T2 is in the range of about 470° F. to about 490° F., and preferably about 480° F., although other second temperatures may be used. In further embodiments, the second pressure P2 is substantially equal to the first pressure P1, e.g., preferably about 20 psig, although other second pressures may be used. The heated compressed air may be conveyed from the heater 20 to the first inlet 14a using any suitable plumbing.

Still referring to FIG. 1, the process fluid section 12b of the system 10 includes a device that provides molten polymer to the second inlet 14b of the nozzle at a third temperature T3 and a third pressure P3. In embodiments, the device that provides molten polymer includes an extruder 40, although any suitable device that provides molten polymer may be used.

In embodiments, the extruder 40 comprises a screw extruder such as, for example, a vertical single screw extruder. Solid polymer material in the form of beads, pellets, or powder at room temperature is fed into an inlet 45 of the extruder 40. The extruder 40 is structured and arranged to liquefy the polymer material to produce molten polymer at the third temperature T3 and a third pressure P3 at an outlet 50 of the extruder 40. The extruder 40 may include various stages 47a, 47b, . . . , 47n for liquefying the polymer. The molten polymer may be conveyed from the outlet 50 of the extruder 40 to the second inlet 14b using any suitable plumbing.

The polymer material may be an olefin, and preferably is polypropylene or polyethylene. The polymer melt rheology plays a role in the spraying characteristics of the system 10. For example, it is advantageous when the surface tension of the molten polymer is sufficiently low to permit the heated compressed air to shear the molten polymer into fine droplets to achieve a good spray pattern. As such, in a particular non-limiting exemplary embodiment, the polymer is amorphous polypropylene having an average molecular weight (Mw) of about 14,000. In embodiments, the polymer material is supplied to the inlet 45 of the extruder 40 in the form of solid beads having a diameter of about 1 mm to about 3 mm, although other size beads, pellets, or powder may be used.

The third temperature T3 and third pressure P3 depend at least partly on the composition of the polymer material and, particularly, the melting characteristics of the polymer material. As such, in a non-limiting exemplary embodiment, the polymer material is polypropylene, the third temperature T3 is in a range of about 400° F. to about 420° F., preferably about 410° F., and the third pressure P3 is in a range of about 75 psig to about 85 psig, preferably about 80 psig, although other third temperatures and third pressures may be used.

Still referring to FIG. 1, the nozzle 16 receives the heated compressed air at the first inlet 14a and the molten polymer at the second inlet 14b. The nozzle 16 uses the heated compressed air to spray the molten polymer onto the container 100. In embodiments, the nozzle 16 is an external mixing, air atomization nozzle that includes the two inlets 14a and 14b and a nozzle outlet 55. An exemplary nozzle that is suitable for use with implementations disclosed herein is the SU1 1/4J nozzle provided by Spraying Systems Co. of Wheaton, Ill., although any suitable nozzle may be used.

In embodiments, the nozzle 16 may be controlled to selectively apply the spray of polymer, e.g., to selectively turn the spray on and off. For example, the nozzle 16 may include a valve 60 having two positions: a first open position that permits molten polymer to be sprayed from the outlet 55, and a second closed position that prevents molten polymer from being sprayed from the outlet 55. The system 10 may further include an actuator 65, such as an electronic, hydraulic, or pneumatic actuator, that moves the valve 60 between the first and second positions. The system 10 may further include a controller 70, such as a programmable microprocessor or other computing device, which provides control signals to the actuator 65 to control the position of the valve 60 for the purpose of selectively turning the spray on and off. In this manner, the system 10 may be employed to spray the container 100 with the molten polymer for a predetermined amount of time in order to provide the container with a substantially uniform thickness polymer coating having a predetermined thickness.

In further embodiments, the system 10 may be configured to provide a nozzle tip clean-out function for the nozzle 16. For example, the nozzle 16 or plumbing upstream of the second inlet 14b may be provided with a second valve 73 that selectively blocks the flow of the molten polymer at or near the second inlet 14b. The controller 70 may be configured to open the first valve 60 and close the second valve 73, thereby causing only the heated compressed air to flow through the outlet 55, which may be used to purge contaminants from the nozzle 16.

Still referring to FIG. 1, the system 10 may further include a conveying system 75 that moves a plurality of containers 100 through a spray zone 80 of the nozzle 16. The conveying system 75 may include a belt, carousel, hangers, rollers, track or any other suitable system 77 for moving a plurality of containers 100 past the nozzle 16 in a serial fashion, e.g., one container at a time. The conveying system 75 may further include a drive mechanism 85, such as a drive gear or drive roller, which provides a motive force that causes the conveying system 75 to move the plurality of containers 100 through the spray zone 80. The conveying system 75 may further include a controller 90 that provides control signals to the drive mechanism 85 for selectively actuating the drive mechanism 85, e.g., to start and stop the movement of the conveying system 75.

In accordance herewith, the conveying system 75 may be configured, via the controller 90 and drive mechanism 85, to move one of a plurality of containers into the spray zone 80. When the container 100 is in the spray zone 80, the controller 70 may cause the nozzle 16 to spray molten polymer for a predetermined amount of time, e.g., by opening the valve 60 via the actuator 65, thereby applying a coating of the polymer to the container 100. After the predetermined amount of time, the controller 70 may cause the nozzle 16 to stop spraying, e.g., by closing the valve 60 via the actuator 65. After spraying the container 100 and while the spray is turned off, the conveying system 75 may move the polymer coated container 100 out of the spray zone 80 and move the next container 100' into the spray zone 80. In this manner, implementations may be used to move containers 100 one at a time into the spray zone 80 of the nozzle 16, spray each respective container with the molten polymer for a predetermined duration while the respective container is within the spray zone 80, and turn off the spray when one of the containers is not in the spray zone 80.

In embodiments, the controllers 70 and 90 may be configured to communicate with one another to achieve the following functions: turn off the nozzle 16 (e.g., prevent polymer spraying) when the conveying system is moving one container 100 out of the spray zone 80 and a next container 100' into the spray zone 80; stop or substantially slow the drive mechanism 85 when the next container 100' is in the spray zone 80; turn on the nozzle 16 (e.g., cause polymer spraying) for a predetermined amount of time when the next container 100' is in the spray zone 80. The controllers 70 and 90 may be separate controllers, or may be combined as a single controller. One or more sensors, such as photo sensors, may be used to detect when one of the containers is entering and/or leaving the spray zone. The one or more sensors may transmit data indicating a container is entering and/or leaving the spray zone to one or both controllers 70 and 90.

It is to be understood that at least one of the second temperature T2, the second pressure P2, the third temperature T3, and the third pressure P3 may vary from the exemplary values disclosed herein based on the parameters of the system 10, such as the type of polymer being sprayed and/or the operational characteristics of the nozzle 16. Accordingly, the second temperature T2, the second pressure P2, the third temperature T3, and the third pressure P3 are selected based on system parameters to achieve the following functions: the polymer is provided to the second inlet of the nozzle in a molten state, e.g., as molten polymer; the molten polymer is atomized by the nozzle and sprayed onto the container 100; and the molten polymer stays in a molten state as it travels between the nozzle 16 and the container 100, e.g., the molten polymer does not solidify prior to coming into contact with the container 100.

For example, the second temperature T2 should be sufficiently high such that when the heated compressed air expands to atmospheric pressure outside the nozzle 16, the temperature of the air does not drop below the melting point of the polymer. This is because the molten polymer might solidify before contacting the surface of the container 100 if the nozzle air exit temperature is too low relative to the melting point of the polymer. Thus, in embodiments, the second temperature T2 may be selected at least partly based on the melting temperature of the polymer.

As another example, the second pressure P2 should be compatible with the nozzle 16 to atomize the molten polymer. External mixing, air atomization nozzles are typically designed to operate within a predefined range of pressures in order to ensure sufficient atomization of a particular process fluid. Thus, in embodiments, the second pressure P2 may be selected at least partly based on the characteristics of the nozzle 16.

Figure 2:
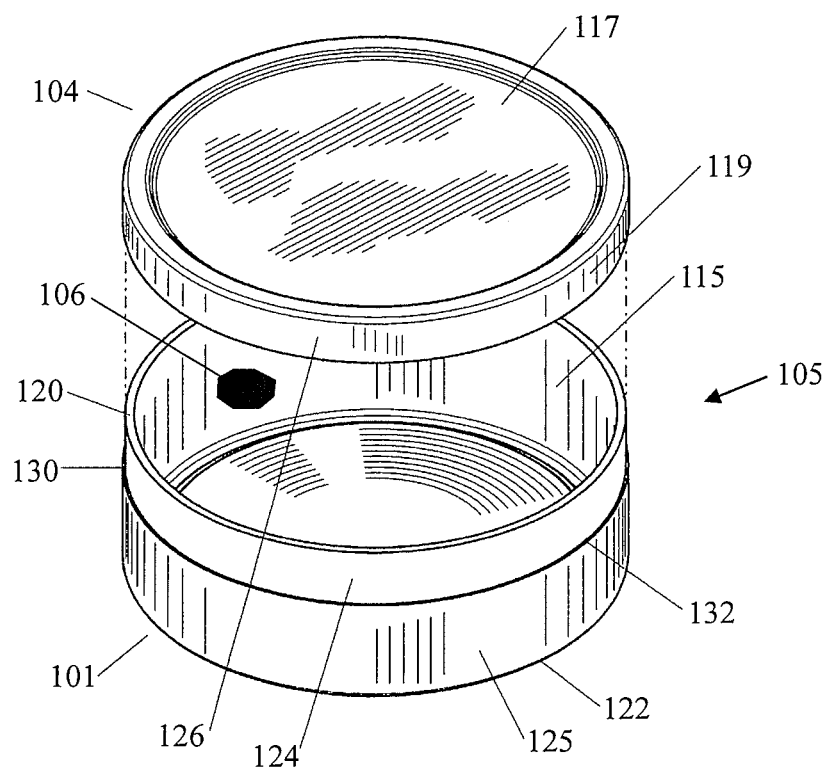
FIGS. 2 and 3 show a polymer coated container in accordance herewith.
Figure 3:
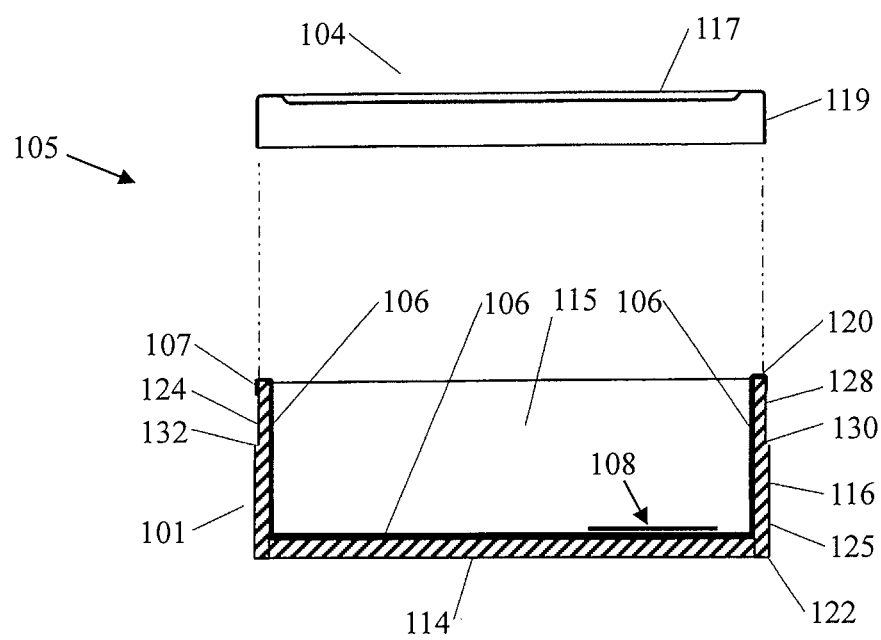

FIGS. 2 and 3 show a polymer coated container 105 in accordance herewith. In embodiments, the coated container 105 comprises a container 100 having one or more surfaces coated with a polymer layer 106 of polymer material applied using the system 10 described with respect to FIG. 1. The coated container 105 may be sized and configured to hold MST product inside a cavity defined by the container 105.

In embodiments, the container 105 comprises a body 101 that includes a bottom portion 114 and a side portion 116 that combine to define an open cavity 115. An upper edge 120 of the side portion 116 defines an open mouth of the cavity 115. The side portion 116 may be substantially perpendicular to the bottom portion 114. More specifically, the body 101 may form a right circular cylinder having an open top, where the bottom portion 114 has a circular or disk shape forming the base or bottom wall of the cylinder and the side portion 116 is an annular wall forming the side of the cylinder.

The container 105 optionally includes a lid 104, which is receivable by sliding over the upper edge 120 of the side portion 116 within a lid recess 124. The lid 104, which may be a metal or a metal alloy, preferably contains tin, aluminum, or the like. The lid 104 may include a top wall 117 and a side wall 119.

The side portion 116 preferably includes multiple sections, such as an upper section including the lid recess 124 and a lower section including a body portion 125. If divided into multiple portions, the lid recess 124 is the upper section of the side portion 116 and the body portion 125 is the lower section of the side portion 116. The body portion 125 extends upwardly from a bottom edge 122 and joins with the lid recess 124.

The side portion 116 is preferably from about 0.068 to about 0.055 inches thick; however, such thickness may vary. Preferably, the side portion 116 is about ¾ inches high; however, other heights are appropriate depending on the container desired or the intended use.

The lid recess 124 allows the body 101 to receive the lid 104. The inner diameter of the lid side wall 119 and the outer diameter of the lid recess 124 are selected to provide a friction-fit that holds the lid 104 in place on the body 101. Preferably, the lid recess 124 is recessed a sufficient distance so that an outside surface 126 of the lid side wall 119 is flush with an outside surface of the body portion 125 when the lid 104 is received on the body 101. In this manner, the lid recess 124 allows the outside diameter of a received lid 104 to be flush with the outside diameter of the container body portion 125.

The lid recess 124 may be formed by compressing, trimming, filing, or shaving the upper section of the side portion 116 to recess a portion of this upper section relative to the lower section of the side portion 116. Preferably, the lid recess 124 is recessed between about 0.030 and about 0.010 inches inward relative to the outer surface of the body portion 125 and, most preferably, about 0.010 inches. After formation, the lid recess 124 includes a neck portion 128 that extends downwardly from the upper edge 120, an outwardly extending landing portion 130, and a shoulder portion 132 that transitions the landing portion 130 to the body portion 125.

In alternative embodiment, the body 101 may have a side portion 116 with only one section. In such alternative embodiment, the body 101 would not have the lid recess 124. In this form of the body 101, any lid 104 used with body 101 would not be flush with the side portion 116 and the outside diameter of the body 101 would be slightly less than the inside diameter of the lid 104 in order for the body 101 to accept the lid 104.

The bottom portion 114 defines a bottom surface of the cavity 115. That is, the bottom portion 114 extends between opposing surfaces of the side portion 116. The bottom portion 114, in one embodiment, is between about 0.068 to about 0.055 inches thick; however, other thicknesses are possible depending on the container or intended use. The bottom portion 114 may be a circular base or disk that, in a preferred embodiment, is about 2.5 inches in diameter; however, other sizes are suitable depending on the desired body 101 or intended use.

In embodiments, the body 101 is composed of paperboard, e.g., cardboard. For example, the body may be formed from fibers, preferably from compressed cellulose, pulp, cardboard, pulp fiber or a mixture thereof that can be formed into the desired shape, and has a predetermined moisture level and thickness. In addition, the body 101 may also include corrugate, brown paper, clipboard, recycling paper, copy paper, printer paper, polymer fibers, or cotton fibers.

The body 101 is preferably sized and shaped as a traditional MST can, but other sizes or shapes can be utilized as desired for other uses. The body 101 is most preferably a cylindrical body having a diameter of about 2.0 to about 3.0 inches, preferably, about 2.5 inches and a height of about 0.5 to about 1.5 inches, preferably, about ¾ inches. However, other sizes may also be suitable. In use, cavity 115 is preferably sized to receive a quantity of MST; however other materials may also be received in the body 101.

Still referring to FIGS. 2 and 3, according to aspects disclosed herein, the polymer layer 106 is provided on the interior surfaces of the body 101, e.g., the surfaces that define the cavity 115. For clarity, the polymer layer 106 is only partially depicted in FIG. 2. In embodiments, the polymer layer 106 preferably has a thickness in a range of about 0.005 inches to about 0.100 inches, although other thicknesses may be used. The polymer layer 106 may be a single layer, e.g., applied using a single burst of spray from the nozzle 16 of system 10. Alternatively, the polymer layer 106 may comprise plural layers of polymer material, e.g., applied using plural bursts of polymer spray from the nozzle of system 10.

The polymer layer 106 may optionally be applied to one or more exterior surfaces of the body 101. For example, the polymer layer 106 may extend to a portion 107 of the outer surface of the lid recess 124. In this manner, the polymer layer 106 may be used to provide a desired amount of friction between the body 101 and the lid 104 when the lid 104 is placed on the lid recess 124, e.g., when the container 105 is closed with the lid 104. Alternatively, the polymer may be confined to the interior surfaces of the body 101, e.g., not applied to the exterior surface of the lid recess 124.

In accordance herewith, an additional wax layer may be applied on the polymer layer 106. The wax layer is partially shown at 108 may be formed in any suitable manner. The respective thicknesses of the polymer layer and the wax layer 108 may be controlled such that the combined thickness of the polymer layer and the wax layer 108 is in the range of about 0.005 inches to about 0.100 inches, although other combined thicknesses may be used.

Figure 4:
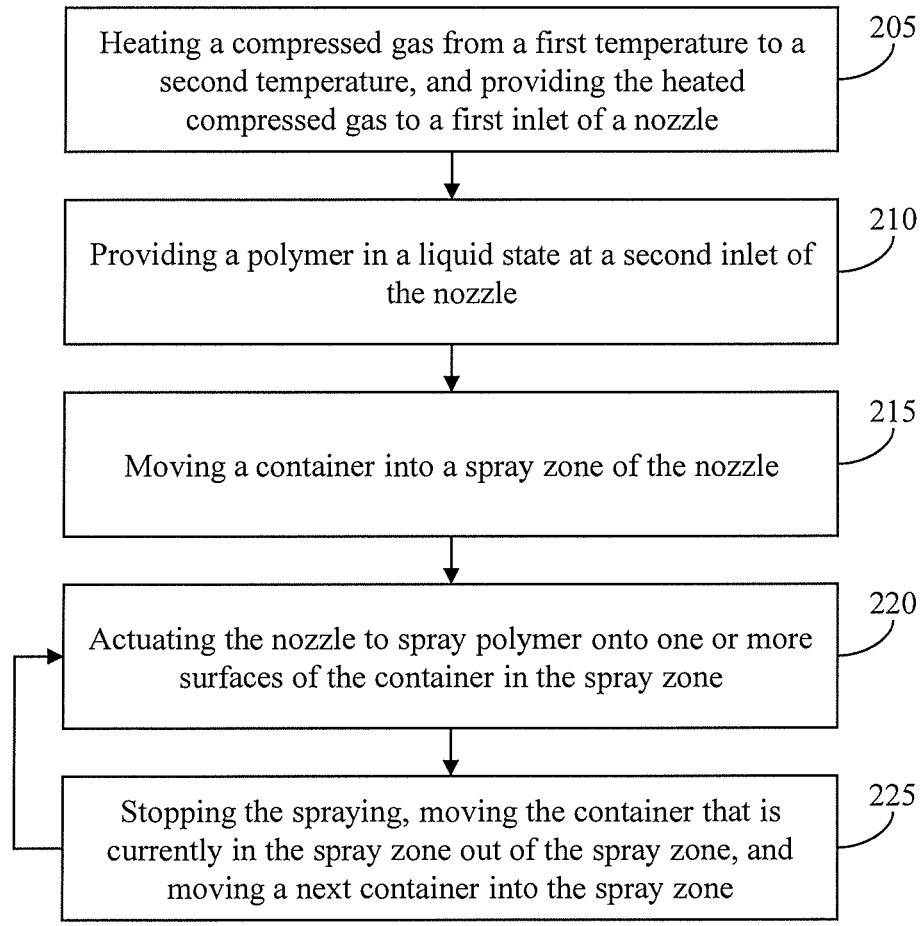
FIG. 4 shows a method of providing a polymer coating on a container in accordance herewith.

FIG. 4 shows a method of providing a polymer coating on a container in accordance herewith. The steps of the method may be performed, for example, using the system 10 described with respect to FIG. 1. At step 205, compressed gas is heated from a first temperature to a second temperature, and the heated compressed gas is provided to a first inlet of a spray nozzle. Step 205 may be performed, for example, as described above with respect to compressed air section 12a of system 10.

At step 210, polymer is provided in a liquid state at a second inlet of the nozzle. Step 210 may be performed, for example, as already described with respect to process fluid section 12b of system 10.

At step 215, a container is moved into a spray zone of the nozzle. This may be performed, for example, using conveying system 75 of system 10 and as already described herein.

At step 220, the nozzle is actuated to spray molten polymer onto one or more surfaces of the container that is currently in the spray zone. Step 220 may be performed, for example, as described herein with respect to valve 60, actuator 65, and controller 70 of system 10. More specifically, the valve of the nozzle may be selectively actuated to open the nozzle for a predetermined amount of time, thereby causing the nozzle to spray the molten polymer for the predetermined amount of time.

At step 225, the spraying is stopped, e.g., using valve 60, actuator 65, and controller 70. Also at step 225, the container that is currently in the spray zone is moved out of the spray zone, and a next container is moved into the spray zone e.g., using conveying system 75.

Following step 205, the polymer is allowed sufficient time to cool and solidify. Subsequently, a portion of moist smokeless tobacco may be provided in the cavity defined by the container, the container may be closed with a lid, and a label may be affixed to an exterior surface of the container, all of which may be performed using conventional processes.

The particulars shown herein are by way of example and for purposes of illustrative discussion of the embodiments of the instant disclosure only and are presented in the cause of providing what is believed to be the most useful and readily understood description of the principles and conceptual aspects. In this regard, no attempt is made to show structural details in more detail than is necessary for the fundamental understanding of the instant disclosure, the description taken with the drawings making apparent to those skilled in the art how the several forms may be embodied in practice.

It is noted that the foregoing examples have been provided merely for the purpose of explanation and are in no way to be construed as limiting. While aspects have been described with reference to an exemplary embodiment, it is understood that the words which have been used herein are words of description and illustration, rather than words of limitation. Changes may be made, within the purview of the appended claims, as presently stated and as amended, without departing from the scope and spirit. Although aspects disclosed herein have been described with reference to particular means, materials, and/or embodiments, the instant disclosure is not intended to be limited to those particulars; rather, the instant disclosure extends to all functionally equivalent structures, methods and uses, such as are within the scope of the appended claims.

What is claimed:

1. A system for applying a coating to a plurality of cylindrical paperboard containers, comprising:
   a nozzle having a spray zone;
   a gas source that provides heated compressed air to a first inlet of the nozzle;
   a polymer source that provides amorphous polypropylene in a liquid state to a second inlet of the nozzle;
   a first valve within the nozzle, the first valve configured to move between a first open position and a first closed position so as to permit or prevent flow of the heated compressed air and the amorphous polypropylene through an outlet of the nozzle;

a second valve within the nozzle proximate the second inlet, the second valve configured to move between a second open position and a second closed position so as to permit or prevent flow of the amorphous polypropylene to the first valve;

a conveying system structured and arranged to sequentially convey the plurality of cylindrical paperboard containers through the spray zone; and an electronic controller configured to selectively control the first valve by moving the first valve between the first open position and the first closed position, the electronic controller configured to selectively control the first valve with an actuator to permit flow through the nozzle to spray the heated compressed air and the amorphous polypropylene onto one of the plurality of cylindrical paperboard containers when the conveying system positions the one of the plurality of cylindrical paperboard containers in the spray zone and to prevent flow through the nozzle when a gap between adjacent ones of the plurality of cylindrical paperboard containers is in the spray zone.

2. The system of claim 1, wherein the nozzle includes an air atomization, external mixing nozzle.

3. The system of claim 1, wherein the amorphous polypropylene has a molecular weight and surface tension such that the heated compressed air shears the amorphous polypropylene into droplets at a location external of the nozzle.

4. The system of claim 1, further comprising:

an extruder configured to heat and liquefy the amorphous polypropylene, wherein the amorphous polypropylene is initially in a form of solid beads.

5. The system of claim 4, wherein each of the solid beads has an average diameter within the range of 1 mm to 3 mm.

6. The system of claim 1, wherein the electronic controller is configured to move the first valve to the first open position and the second valve to the second closed position to purge the nozzle.

7. The system of claim 1, wherein the amorphous polypropylene has an average molecular weight (Mw) of about 14,000.

* * * * *